United States Patent [19]

Campbell

[11] 4,451,606
[45] May 29, 1984

[54] COPOLYMERIC NUCLEATING AGENT FOR POLYESTER

[75] Inventor: Richard W. Campbell, Evansville, Ind.

[73] Assignee: General Electric Company, Pittsfield, Mass.

[21] Appl. No.: 469,076

[22] Filed: Feb. 23, 1983

[51] Int. Cl.$^3$ .................. C08G 63/70; C08G 63/76
[52] U.S. Cl. .................. 524/445; 260/DIG. 35; 524/449; 524/451; 524/539; 524/604; 524/605; 525/444; 528/275; 528/279; 528/285; 528/295
[58] Field of Search ............ 260/DIG. 35; 524/445, 524/449, 451, 604, 605, 539; 525/444; 528/275, 279, 285, 295

[56] References Cited

U.S. PATENT DOCUMENTS

| | | | |
|---|---|---|---|
| 3,563,942 | 2/1971 | Heiberger | 528/295 |
| 3,706,699 | 12/1972 | Conix et al. | 524/430 |
| 3,761,450 | 9/1973 | Herwig et al. | 525/437 |
| 3,843,615 | 10/1974 | Herwig et al. | 525/444 |
| 3,953,394 | 4/1976 | Fox et al. | 524/86 |
| 4,104,262 | 8/1978 | Schade | 528/295 |
| 4,119,680 | 10/1978 | Vachon | 528/295 |
| 4,163,100 | 7/1979 | Bier et al. | 524/539 |
| 4,167,395 | 9/1979 | Engelhardt et al. | 528/295 |
| 4,212,791 | 7/1980 | Avery et al. | 524/539 |
| 4,217,441 | 8/1980 | Bayless | 528/295 |
| 4,223,113 | 9/1980 | Bier et al. | 525/439 |
| 4,223,125 | 9/1980 | Bier et al. | 528/305 |
| 4,267,289 | 5/1981 | Froix | 524/539 |
| 4,340,519 | 7/1982 | Kotera et al. | 524/539 |
| 4,380,621 | 4/1983 | Nield et al. | 528/275 |
| 4,390,687 | 6/1983 | Tung | 528/295 |

FOREIGN PATENT DOCUMENTS

| | | |
|---|---|---|
| 56-147822 | 11/1981 | Japan ............ 528/295 |
| 57-57714 | 4/1982 | Japan ............ 528/295 |
| 1211390 | 11/1970 | United Kingdom . |
| 1282679 | 7/1972 | United Kingdom . |
| 2015013 | 2/1979 | United Kingdom . |

*Primary Examiner*—Ronald W. Griffin
*Attorney, Agent, or Firm*—Edward K. Welch, II; William F. Mufatti

[57] ABSTRACT

Novel nucleating agents have been discovered which are effective in polyesters, especially poly(ethylene terephthalate). The novel nucleating agents are copolymers derived from a poly(alkylene terephthalate) and a sulfonate salt.

Also provided by this invention are a process for nucleating polyesters, particularly poly(alkylene terephthalates), especially poly(ethylene terephthalate) and the compositions so produced.

35 Claims, No Drawings

COPYLMERIC NUCLEATING AGENT FOR POLYESTER

FIELD OF THE INVENTION

The present invention relates to copolymers derived from a poly(alkylene terephthalate) and a sulfonate salt which have been found to be effective as nucleating agents for filled and unfilled formulations of poly(ethylene terephthalate). The invention also discloses a novel method for nucleating filled and unfilled poly(ethylene terephthalate) and the compositions so produced.

BACKGROUND OF THE INVENTION

High molecular weight linear polyesters and copolymers of glycols and terephthalic or isophthalic acid have long been known. Such polyesters are described by Whinfield et al., U.S. Pat. No. 2,465,319 and by Pengilly, U.S. Pat. No. 3,047,539. These patents and others also disclose that these polyesters are particularly useful in film and fiber applications.

One particular type of polyester of interest to the present inventor is poly(ethylene terephthalate). This polyester crystallizes relatively very slowly from the melt and three-dimensional parts molded from it in conventional molding cycles are amorphous in thin sections. The development of molecular weight control and the use of nucleating agents to hasten crystallization were two factors which allowed the exploitation of poly(ethylene terephthalate) resin in molding and extrusion applications. Subsequent to these developments poly(ethylene terephthalate) molding compositions were produced in both reinforced and flame retardant embodiments.

It is now known that other members of the polyester family, notably poly(butylene terephthalate) resins, crystalline very rapidly from the melt. Such resins provide excellent molding compositions which do not require precise molecular weight control or nucleating agents. These provide excellent molding compositions because they can be fabricated with moderate stock temperatures, low mold temperatures and rapid cycle times. In particular, with respect to lower mold temperatures, poly(butylene terephthalate) may be molded at mold temperatures of 150° F., whereas poly(ethylene terephthalate) is preferably molded at mold temperatures of at least 200° F. for non-nucleated and conventionally nucleated resins. Because of their highly crystalline nature, poly(butylene terephthalate) resins are superior in chemical resistance, thermal stability and product appearance. Such resins also have superior strength, stiffness, low friction and wear properties as well as good resistance to brittle fracture.

In U.S. Pat. No. 3,953,394 Fox, et al. disclose an alloyed combination of these two polyester resins which overcomes the disadvantages described above and which provides properties which are superior to either of the components in their pure states.

Each of the foregoing patents or applications is hereby incorporated by reference.

As mentioned, for certain applications requiring poly(ethylene terephthalate) it has been necessary to include a nucleant or nucleating agent to facilitate the production of a relatively more crystalline product. Some nucleating agents which have become well known in the art include, for example, talc, sodium stearate, ethylene based ionomer resins etc.

The present invention is based upon the discovery of a class of nucleating agents which are effective in polyesters such as poly(ethylene terephthalate). More specifically, it has been discovered that copolymers of a poly(alkylene terephthalate) and certain salts are effective in the nucleation of polyesters especially poly(ethylene terephthalate). These nucleating agents are more effective than talc, do not degrade the resin as, e.g., stearates, and do not require the addition of a plasticizer as often found with ionomer nucleants.

The present invention also pertains to a novel method of nucleating polyesters, in particular poly(ethylene terephthalate), and the compositions so produced. These novel compositions are characterized in that they provide injection moldable parts which crystallize more rapidly than poly(ethylene terephthalate) alone. Such nucleated resins provide the additional benefit of being relatively free of either sink marks or large, transparent amorphous regions which are a characteristic of non-nucleated poly(ethylene terephthalate) moldings. Furthermore, the copolymeric nucleant of the present invention has been shown to be effective in both filled and unfilled versions of poly(ethylene terephthalate). Additionally, it is expected that formulations of the present invention may contain co-nucleants (e.g., traces of talc), plasticizers or flame retardants.

It is therefore an object of the present invention to provide copolymers of polyester and certain salts which are effective nucleants for polyester compositions.

It is another object to provide polyester compounds which utilize a polyester base resin which has been nucleated with the copolymer of the present invention.

It is another object to provide suitable processes to implement the foregoing objects.

These and other objects will become apparent to those skilled in the art upon consideration of the present disclosure and claims.

DESCRIPTION OF THE INVENTION

According to this invention there are provided copolymer compositions which are effective for use as nucleating agents for polyesters. The copolymer is a composition which is comprised of the polymerization reaction product of:

a dialkyl terephthalate such as dimethyl terephthalate;

a sulfonate salt such as those derived from sulfoisophthalic acids, sulfoterephthalic acids, dialkyl sulfoisophthalates, dialkyl sulfoterephthalates, bis-hydroxyethyl sulfoisophthalates, sulfonaphthalene dicarboxylic acids or derivatives of these (including for example sodium dimethyl-5-sulfoisophthalate);

an alkyl diol suitable for the production of a polyester copolymer product (including, for example, 1,4-butane diol or ethylene glycol); and sufficient catalyst to provide a copolymer of the poly(alkylene terephthalate) and the selected sulfonate. A particularly suitable catalyst is tetra(2-ethylhexyl)titanate. Other suitable catalysts include tetrabutyl titanate and, especially for copolymers of poly(ethylene terephthalate), antimony oxide or calcium acetates.

State of the art esterification/transesterification processes may be employed for the production of the copolymers of the present invention. In general, by way of example only, the process may encompass a multi-tiered process wherein the ingredients are added to a stirred reaction container at 165° C. at normal atmospheric pressure. With the onset of MeOH generation, the temperature may gradually be increased, but not so fast as to cause the DMT to sublime out, to 180° C. and then about 225° C. Once removal of the MeOH is complete, the system is put under full vacuum (≦0.2 mmHg) and the temperature raised to approximately 250° C. After a short time a good increase in melt viscosity is noted. The viscous copolymer may be removed by known methods and ground, e.g. to approximately 10 mesh on a Wiley Mill, for use as a nucleating agent.

The poly(ethylene terephthalate) resin component is disclosed in Whinfield et al U.S. Pat. No. 2,465,319. Such polymeric linear terephthalic esters are composed of recurring structural units of the formula

These poly(ethylene terephthalate) resins can be made following the teachings of the Whinfield et al and Pengilly patents above-mentioned, incorporated herein by reference, and are readily available from a number of commercial sources.

Preferred polyester resins for the copolymeric nucleating agent will be of the family of high molecular weight, polymeric butylene glycol terephthalates having repeating units of the general formula

Especially preferred polyesters for use in the copolymer are poly(1,4-butylene terephthalate) resins which are commercially available. Special mention is made of this polyester because it crystallizes at an especially rapid rate. Also contemplated are mixtures of such esters (i.e., copolymers) with a minor amount, e.g. from 0.5 to 2% by weight, of units derived from aliphatic or aromatic dicarboxylic acids and/or aliphatic polyols, e.g., glycols. These can also be made following the teachings of the above-mentioned Pengilly and Whinfield et al patents, suitably modified, if necessary.

The foregoing copolymers are found to be effective nucleants for thermoplastic polyesters, especially poly(alkylene terephthalates). Generally, any effective, nucleating amount of the nucleating copolymer may be admixed with the thermoplastic polyesters. Specifically the amount may vary from 0.025 to 100 parts by wt, preferably 0.05 to 50 parts by wt., most preferably from 0.05 to 4.0 parts by wt. of the nucleating copolymer based on 100 parts by weight of the thermoplastic polyester compositions.

Also, according to the present invention there are provided novel thermoplastic polyester compositions which may be filled or unfilled and which comprise a poly(alkylene terephthalate) and a nucleating amount of the above disclosed copolymeric nucleating agent.

The poly(alkylene terephthalate) to which this invention applies includes poly(ethylene terephthalate), poly(1,4-butylene terephthalate), copolyesters thereof, and blends of any or all of the foregoing. The invention is especially useful for poly(ethylene terephthalate) and poly(ethylene terephthalate/poly(butylene terephthalate) blend compositions.

Poly(ethylene terephthalate) and poly(1,4-butylene terephthalate) are widely available commercially or may be prepared following the teachings of Whinfield et al and Pengilly, above.

Suitable copolyesters may be prepared by ester interchange in accordance with standard practices. These are also described above. Preferred copolyesters are derived from terephthalic acid and/or isophthalic acid and/or derivatives thereof and one or more glycol, which may be a straight or branched chain aliphatic and/or cycloaliphatic glycol.

Blends to which this invention applies are well known in the art. Especially preferred blends are of poly(ethylene terephthalate) and poly(1,4-butylene terephthalate), disclosed by Fox et al, above.

Suitable fillers for the nucleated compositions of the present invention include glass, mica, talc, clay and the like. They may be used alone or in combination with one another in effective amounts.

DESCRIPTION OF THE PREFERRED EMBODIMENTS

The following examples illustrate the present invention and are not intended to limit the invention in any manner. Examples 1 and 3 demonstrate the preparation of suitable copolymeric nucleating agents. Examples 2 and 4 demonstrate the effectiveness of these copolymeric nucleating agents in filled and unfilled thermoplastic polyester compositions.

The effectiveness of the nucleating agents is exemplified by the $T_i$ and $T_{\frac{1}{2}}$ crystallization factors. As will be well recognized by those skilled in the art, $T_i$ represents the crystallization induction time and reflects the time required for the initiation of crystallization in a polymer sample. It is further recognized that relatively lower $T_i$ values are advantageous because they allow faster mold cycle times. Similarly, $T_{\frac{1}{2}}$ represents the midpoint between the onset of crystallization and the point of achieving complete or maximum crystallization. $T_{\frac{1}{2}}$ is a measure of crystallization rate. A fast rate, as exemplified by a low $T_{\frac{1}{2}}$ value, allows molded parts to have a high degreee of crystallinity.

EXAMPLE 1

A copolymer of poly(1,4-butylene terephthalate) and the sodium salt of sodium dimethyl 5-sulfoisophthalate was prepared by reacting 116 g (0.60 moles) dimethyl terephthalate, 44 g (0.149 moles) sodium dimethyl-5-sulfoisophthalate (Aldrich Catalog 15,001-0) and 112 g (1.24 moles) 1,4-butane diol in the presence of 0.15 ml tetra(2-ethyl hexyl)titanate (DuPont) as a catalyst. These ingredients were stirred in a 3-neck flask at about 180° C. under atmospheric pressure. The reaction slowly evolved methanol. After approximately one-half or more of the expected methanol had been removed, the sodium salt dissolved; prior to that time the salt had appeared insoluble. 57 ml methanol was recovered and the bath temperature was increased to 250° C. while a full vacuum was applied to the polymerizing mixture (approximately less than 0.2 mm Hg vacuum). An increase in melt viscosity was noted after 10 minutes. The reaction was stopped after 42 minutes and 91 g of product was obtained. The recovered material was found to be insoluble in $CH_2Cl_2$. Portions of the copolymer were ground on a Wiley mill to approximately 10 mesh. This copolymer was designated PBT-5-sulfo-IPA salt.

EXAMPLE 2

Formulations described in Table 1 below were prepared. The copolymer provided by Example 1 was added to unfilled poly(ethylene terephthalate) as well as 30% glass fiber filled poly(ethylene terephthalate). Each of the ingredients were dry blended, extruded (extrusion temperature 480°–580° F.) and thereafter pelletized and injection molded (mold temperature approximately 150° F.), whereupon crystallization rates were compared. Compositions 1, 3, 5 and 6 were provided for comparison and did not contain the PBT/Sulfonate copolymer nucleating agent.

Crystallization rates of the pellets were determined by Depolarized Light Intensity (DLI) measurements. Samples were melted on a hot plate between cover slips at 560° F. (293° C.) and quickly transferred to a hot stage at 302° F. (150° C.) of a polarizing microscope for crystallization and viewed between cross-polars. Table 1 depicts the results of the crystallization evaluation wherein $T_i$ represents crystallization induction time in seconds and $T_{\frac{1}{2}}$ represents the crystallization half-time in seconds, as discussed above.

TABLE 1

| Composition | 1 | 2 | 3 | 4 | 5 | 6 |
|---|---|---|---|---|---|---|
| poly(ethylene terephthalate) | 100 | 99 | 70 | 69 | 67.5 | 67.2 |
| glass fibers | — | — | 30 | 30 | 30 | 30 |
| PBT-5-sulfo-IPA salt[b] | — | 1 | — | 1 | — | — |
| diacetyl dibenzylidene sorbitol | — | — | — | — | 1.0 | 1.0 |
| NPG bis benzoate | — | — | — | — | 1.5 | 1.5 |
| talc | — | — | — | — | — | 0.3 |
| $T_i$ (sec) | 21 | 18 | 12 | 3.5 | 10 | 4.8 |
| $T_{\frac{1}{2}}$ (sec) | 12 | 10 | 5.5 | 3 | 5 | 6.5 |
| Notched Izod | — | 0.48 | — | 1.24 | 1.13 | 1.26 |
| Unnotched Izod | — | 5.30 | — | 7.53 | 7.18 | 7.46 |
| Flex Strength, psi | — | 15,070 | — | 21,812 | 28,158 | 28,554 |
| Flex Modulus, psi | — | 378,854 | — | 955,555 | 1,025,000 | 1,146,666 |
| Tensile Strength | — | 8,448 | — | 17,493 | 19,114 | 18,986 |
| Melt Viscosity at 266° C. (of pellets) poises | 1,257 | 861 | — | 5,679 | 4,395 | 4,642 |

[a]Scrap PET - Goodyear 5900
[b]Copolymeric nucleant of Example 1
[c]Neopentyl glycol bisbenzoate plasticizer A comparison of Compositions 1 and 2 shows the effectiveness of the PBT-sulfonate copolymeric nucleating agents in unreinforced PET. Comparison of Compositions 3-6 shows the effectiveness of standard nucleants as well as the newly discovered nucleants in glass filled PET. Composition 4 of the present invention also demonstrates that the PET-sulfonate copolymeric nucleating agents of the present invention are more effective than conventional nucleants with, for the most part, retention of good physical properties. Further, crystallization temperatures (Tc peak onset and Tc peak apex) as determined by Differential Scanning calorimeter were comparable to those achieved by known nucleants. Molded parts embodying the invention were opaque.

EXAMPLE 3

Another copolymer was prepared in the manner described in Example 1 by reacting 126.0 g dimethyl terephthalate, 50.3 g sodium-dimethyl-5-sulfoisophthalate, 130 g 1,4-butanediol and 0.2 ml tetra(2-ethyl hexyl)titanate. After one hour, methanol removal was complete and the system was slowly evacuated to 0.2 mm Hg. The reaction was stopped after 38 minutes and 116 g of a very viscous copolymer product was removed.

EXAMPLE 4

Glass filled PET compositions using the copolymeric nucleating agent as prepared in Example 3 were prepared as shown in Table 2. These compositions were prepared as in Example 2 on a Sterling extruder and were oven aged for 3 days at 170° C. prior to molding. Again, DLI crystallization rates were determined as shown in Table 2.

TABLE 2

| Compositions | 1 | 2 | 3 | 4 |
|---|---|---|---|---|
| poly(ethylene terephthalate)[a] | 69.85 | 67.55 | 66.55 | 66.85 |
| glass fibers | 30 | 30 | 30 | 30 |
| PBT-5-sulfo-IPA salt[b] | | | 1.0 | 1.0 |
| Stabilizer | 0.15 | 0.15 | 0.15 | 0.15 |
| Neopentyl glycol bisbenzoate | | 2.0 | 2.0 | 2.0 |
| Talc | | 0.3 | 0.3 | — |
| $T_i$ | 12.0 | 6.5 | 5.5 | 8.5 |
| $T_{1/2}$* | 5.0 | 3.3 | 2.5 | 4.0 |
| Melt Viscosity @ 266° C. (of pellets) poises | 8444 | 6543 | 5654 | 6222 |

[a]scrap PET-Goodyear VITUF 5900
[b]the copolymer of Example 3
*Note:
an initial step increase was observed in compositions 2 and 3 prior to main crystallization step. This step was not included in the calculation of $T_{\frac{1}{2}}$.

A comparison of Composition 1 with Compositions 2-4 shows the improved crystallization in stabilized glass filled PET compositions by incorporating therein either state of the art nucleants or the novel nucleants of the present invention in combination with a plasticizer (NPG.bb). As is evident, the copolymeric nucleating agent of the present invention in these compositions is itself an effective nucleant. However, when used with trace amounts of talc, the improvement in crystallization is even better than is possible with either alone.

Obviously, other modifications and variations of the present invention are possible in light of the above teachings. It is, therefore, to be understood that changes may be made in the particular embodiments of the disclosed invention which are within the full intended scope of the invention as defined by the appended claims.

I claim:

1. A method for effecting, promoting and hastening the crystallization of thermoplastic polyester compositions which comprises admixing an effective, nucleating amount of a nucleating copolymer of a poly(alkylene terephthalate) and a sulfonate salt of an aromatic dicarboxylic acid or derivative thereof with a thermoplastic polyester.

2. The method of claim 1 wherein the thermoplastic polyester composition is selected from the group consisting of poly(ethylene terephthalate), poly(1,4-butylene terephthalate), and copolyesters thereof, or any combination of these.

3. The method of claim 2 wherein the thermoplastic polyester is poly(ethylene terephthalate).

4. The method of claim 1 wherein the nucleating copolymer is the reaction product of at least one aromatic dicarboxylic acid or dialkyl ester thereof; at least one sulfonate salt derived from compounds selected from the group consisting of sulfoisophthalic acids, dialkyl sulfoisophthalates, sulfoterephthalic acids, dialkyl sulfoterephthalates, sulfonaphthalene dicarboxylic acids and derivatives thereof; at least one diol suitable for the production of a polyester copolymer product; and an amount of catalyst effective for providing a copolymer of a poly(alkyl terephthalate) and said selected sulfonate salt.

5. The method of claim 4 wherein the nucleating copolymer is the reaction product of dimethyl terephthalate, sodium dimethyl 5-isophthalate and 1,4 butanediol.

6. The method of claim 1 wherein the thermoplastic polyester composition is reinforced with a reinforcing amount of fibrous glass.

7. A nucleated thermoplastic polyester composition comprising
 (i) a poly(alkylene terephthalate) resin admixed with
 (ii) an effective nucleating amount of a nucleating copolymer derived from a poly(alkylene terephthalate) and a sulfonate salt of an aromatic dicarboxylic acid.

8. The composition of claim 7 wherein the poly(alkylene terephthalate) resin (i) is selected from the group consisting of poly(ethylene terephthalate), poly(1,4-butylene terephthalate), copolyesters thereof, or any combination of these.

9. The composition of claim 8 wherein the poly(alkylene terephthalate) resin (i) is poly(ethylene terephthalate).

10. The composition of claim 8 wherein the poly(alkylene terephthalate) resin (i) is a blend of poly(ethylene terephthalate) and poly(1,4-butylene terephthalate).

11. The composition of claim 8 wherein the poly(alkylene terephthalate) resin (i) is poly(1,4-butylene terephthalate).

12. The composition of claim 7 wherein the nucleating copolymer (ii) is the reaction product of:
 (a) at least one aromatic dicarboxylic acid or dialkyl derivative thereof;
 (b) at least one sulfonate salt derived from the compounds selected from the group consisting of sulfoterephthalic acids, sulfoisophthalic acids, dialkyl sulfoisophthalates, dialkyl sulfoterephtalates, sulfonaphthalene dicarboxylic acid and derivatives thereof;
 (c) at least one alkyl diol suitable for the production of a polyester copolymer product; and,
 (d) an amount of catalyst effective for providing a copolymer of poly(alkylene terephthalate) and said selected sulfonate salt.

13. A composition as in claim 12 wherein said dialkyl ester (a) is selected from the group consisting of dimethyl terephthalate, dimethyl isophthalate and mixtures thereof.

14. The composition of claim 13 wherein the dialkyl ester (a) is dimethyl terephthalate.

15. The composition as in claim 12 wherein the sulfonate salt (b) is sodium dimethyl-5-sulfoisopthalate.

16. The composition as in claim 12 wherein the alkyl diol (c) is selected from the group consisting of ethylene glycol, 1,4-butanediol, 1,6-hexanediol, and mixtures thereof.

17. The composition of claim 16 wherein the alkyl diol (c) is 1,4 butanediol.

18. The composition of claim 12 wherein the catalyst (d) is tetra(2-ethyl hexyl)titanate.

19. The composition of claim 7 wherein the nucleating copolymer is the reaction product of:
 (i) dimethyl terephthalate;
 (ii) sodium dimethyl-5-sulfoisophthalate;
 (iii) 1,4-butanediol; and,
 (iv) sufficient catalyst to provide a copolymer of poly(1,4-butylene tere-phthalate) and the sodium salt of 5-sulfoisophthalate.

20. The composition of claim 19 wherein the catalyst is tetra(2-ethyl hexyl)titanate.

21. The composition of claim 7 comprising 100 parts by weight poly(alkylene terephthalate) resin (i) and 0.025 to 100 parts by weight of said nucleating copolymer (ii).

22. The composition of claim 7 comprising 100 parts by weight poly(alkylene terephthalate) resin (i) and 0.05 to 50 parts by weight of said nucleating copolymer (ii).

23. The composition of claim 7 comprising 100 parts by weight poly(alkylene terephthalate) resin (i) and 0.05 to 4.0 parts by weight of said nucleating copolymer (ii).

24. The composition of claim 7 further comprising a reinforcing amount of a reinforcing agent.

25. The composition of claim 7 wherein the reinforcing agent is selected from the group consisting of fibrous glass, talc, mica, clay or any combination thereof.

26. The composition of claim 23 wherein the reinforcing agent is fibrous glass.

27. The composition of claim 7 further comprising an effective amount of plasticizer.

28. The composition of claim 27 wherein the plasticizer is neopentyl glycol bisbenzoate.

29. A thermoplastic polyester composition comprising
 (i) poly(ethylene terephthalate); and,
 (ii) a nucleating amount of a copolymer of poly(1,4-butylene terephthalate) and sodium dimethyl-5-sulfoisophthalate.

30. The composition of claim 29 comprising 100 parts by weight poly(alkylene terephthalate) resin (i) and 0.025 to 100 parts by weight of said nucleating copolymer (ii).

31. The composition of claim 29 comprising 100 parts by weight poly(alkylene terephthalate) resin (ii) and 0.05 to 50 parts by weight of said nucleating copolymer (ii).

32. The composition of claim 29 comprising 100 parts by weight poly(alkylene terephthalate) resin (i) and 0.05 to 4.0 parts by weight of said nucleating copolymer (ii).

33. A composition as in claim 29 further comprising a reinforcing amount of a reinforcing agent.

34. The composition of claim 33 wherein the reinforcing agent is selected from the group consisting of fibrous glass, mica, talc, clay or any combination thereof.

35. The composition of claim 29 further comprising an effective amount of plasticizer.

* * * * *